Dec. 28, 1937.                 D. R. DE TAR                    2,103,518
                             DRIVE MECHANISM
                           Filed May 20, 1936
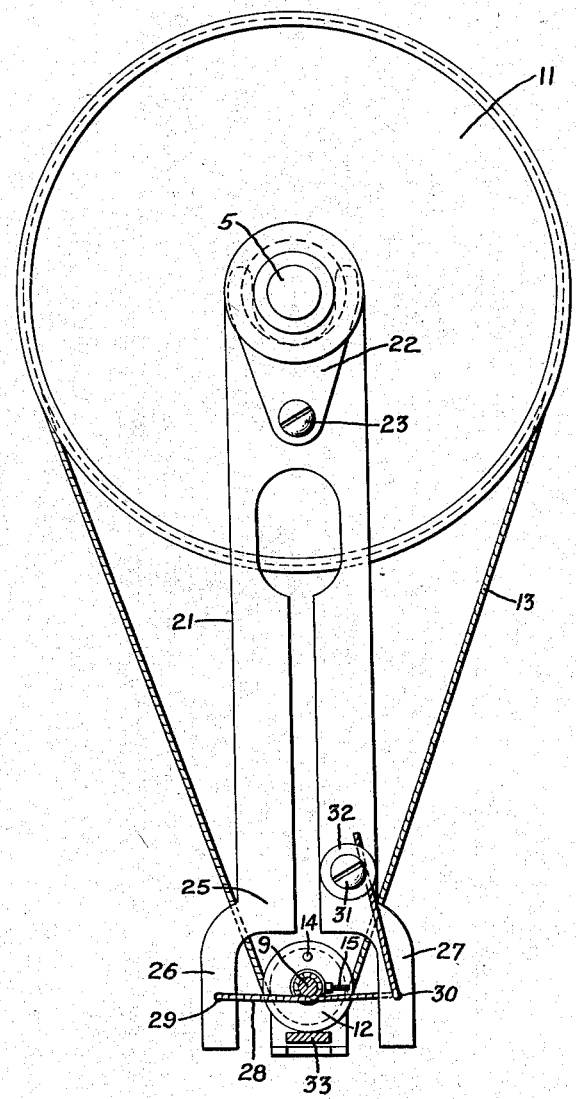
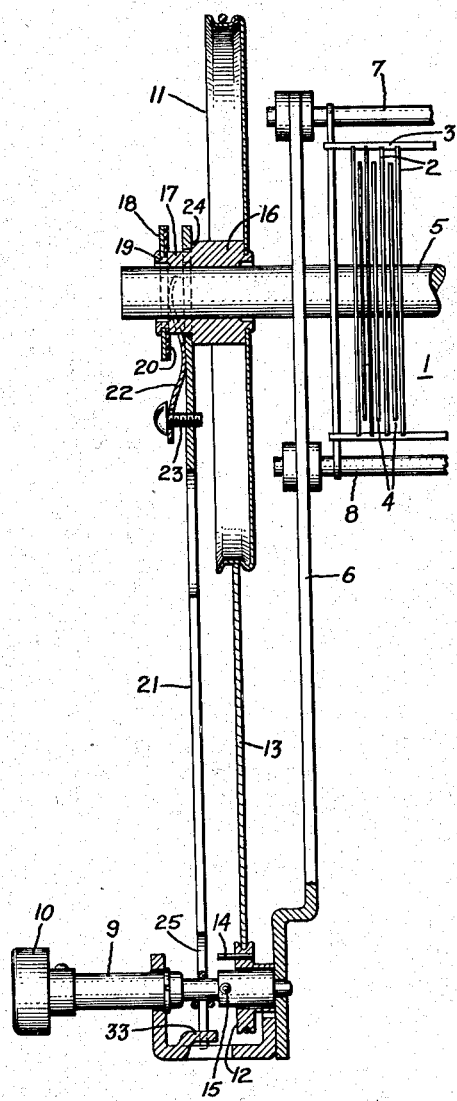
Inventor:
Donald R. DeTar,
by Harry E. Dunbar
His Attorney.

Patented Dec. 28, 1937

2,103,518

UNITED STATES PATENT OFFICE 2,103,518

DRIVE MECHANISM

Donald R. De Tar, Stratford, Conn., assignor to General Electric Company, a corporation of New York Application May 20, 1936, Serial No. 80,732

11 Claims. (Cl. 74—10)

My invention relates to drive mechanisms of the variable speed type and more particularly to drive mechanisms of the type which may conveniently be employed in the adjustment of circuit elements of high frequency apparatus.

One of the objects of my invention is to provide an improved construction for such drive mechanisms whereby they may be more economically manufactured, more compact when assembled, and at the same time are rugged and reliable in operation.

A further object of my invention is to provide an improved drive mechanism whereby the speed at which the element to be controlled is varied and whereby "back-lash" and "lost-motion" is substantially eliminated.

Ordinarily, a high reduction drive is desired only for fine adjustment of the circuit elements of high frequency apparatus requiring relatively small movements of the control member, whereas a smaller reduction is desirable to effect larger adjustments of the circuit elements. It is an object of my invention to provide an improved form of mechanism for effecting this desired movement.

It is a further object of my invention to provide the tuning element or elements of radio apparatus with an improved speed reduction drive mechanism whereby either a fine or a relatively coarse adjustment of said element or elements may selectively be made.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing, in which Figs. 1 and 2 illustrate one embodiment of my invention.

Referring now to Fig. 1 of the drawing, the arrangement illustrated therein comprises a variable condenser 1 having a plurality of stationary plates 2 secured in a mounting frame 3 and a plurality of rotor plates 4 secured on a rotor shaft 5. Condenser 1 is mounted on a stationary frame or base 6 in any convenient manner, such as by means of rods 7 and 8. A manually operable control shaft 9 having an operating knob 10 secured to one of its ends is mounted for rotation in the lower part of frame 6, as shown.

Two means are provided for transmitting rotary motion of control shaft 9 to rotor shaft 5, one means providing a low reduction drive and the second means a high reduction drive therefor. The low reduction drive coupling arrangement includes a large pulley 11 secured to shaft 5, a small pulley, or pinion 12 loosely journalled on control shaft 9 and a flexible drive cable 13 disposed about pulleys 11 and 12. For a purpose which will presently be explained, pulley 11 is provided with a hub 16 having an extended portion 17. A washer 18 is secured in a recessed portion 19 of hub 16. The side of washer 18 adjacent pulley 11 is surfaced with a material 20 adapted to withstand frictional wear, such, for example, as a material composed of a phenolic condensation product. Pulley 12 is provided with a small pin 14 that projects axially therefrom and shaft 9 is provided with a second pin 15 which extends radially from shaft 9 and is positioned to engage pin 14 upon a predetermined rotational movement of shaft 9.

The high reduction drive coupling arrangement includes a forked drive arm 21 loosely journalled on the extended portion 17 of hub 16. A friction spring 22 secured to arm 21 by screw 23 tends to maintain arm 21 against flange 24 of hub 16. Furthermore, spring 22 tends to prevent relative rotational motion of arm 21 with respect to hub 16. When torques above a predetermined amount are applied and relative rotation of the respective elements results, the greatest frictional forces occur between surface 20 of washer 18 and spring 22. The opposite end of arm 21 is forked, the forked portion 25 being disposed in spaced relation about control shaft 9.

Arm 21 and its coupling function may better be understood by reference to Fig. 2. The forked end 25 of arm 21 includes two fingers 26 and 27 which straddle control shaft 9 but which are spaced therefrom by a distance equal to several times the diameter of control shaft 9. This distance should be sufficient to permit angular movement of arm 21 corresponding to substantially one complete revolution of control shaft 9. A flexible cable 28 is secured to finger 26 in any convenient manner, such as by passing it through a hole 29 in finger 26 and knotting it. Cable 28 is wrapped about control shaft 9, passed through a hole 30 in finger 27, and is secured to arm 21 by a screw and washer 31 and 32, respectively. Screw 31 permits subsequent adjustments of the tension in cable 28. The tension should be so adjusted that no slippage occurs between cable 28 and shaft 9 when the forked end 25 of arm 21 is free to move, but which permits slippage when arm 21 is in a restrained position. To secure the desired amount of tension in cable 28, arm 21 may be slit for a purpose readily understood by those skilled in the art.

A suitable stop 33 disposed between fingers 26 and 27 limits the angular movement of arm 21. For convenience and economy of manufacture, stop 33 may be made by punching out a portion of base 6 (as may be seen best in Fig. 1). In order to prevent contact between shaft 9 and fingers 26 or 27, stop 33 is made wider than the diameter of shaft 9 at the point where the forked end 25 straddles the shaft.

The operation of my drive mechanism is as follows: Assume that the respective elements of the drive mechanism are in the position shown in the drawing and that control shaft 9 is then rotated in a clockwise direction. By reason of the cord connection 28 between shaft 9 and arms 26 and 27, rotation of shaft 9 causes the forked end 25 of arm 21 to move to the left from the position shown in Fig. 2. Since arm 21 is frictionally coupled to the rotor shaft 5 of the condenser through hub 16 of pulley 11, movement of arm 21 to the left causes rotor shaft 5 to move through an angle corresponding to that moved through by arm 21. The reduction obtained by this form of coupling arrangement depends, of course, upon the effective length of arm 21 and the diameter of shaft 9 at the point where flexible cable 28 is wrapped about it. For example, where the effective length of arm 21 is five inches and the effective radius of shaft 9 is $\frac{1}{10}$th of an inch, a reduction ratio of 50 to 1 is obtained. It should be noted that this extremely high reduction is obtained in a single step so that the mechanical efficiency is higher than that of previous devices known in the prior art requiring two reduction steps.

When pin 15 on shaft 9 engages pin 14 on pulley 12, the latter rotates with control shaft 9, thus causing rotor shaft 5 to be directly driven through flexible cable 13 and pulley 11. When finger 27 comes in contact with stop 33 slippage occurs between cable 28 and shaft 9 and also between arm 21 and hub 16, whereby further drive of the condenser is produced by the cable connection 13. The reduction obtained by this coupling arrangement depends, of course, upon the ratio of effective diameters of pulleys 11 and 12. As shown in the drawing, the reduction ratio is approximately 6 to 1.

The high reduction drive again becomes effective when the direction of rotation of control shaft 9 is reversed and continues for substantially one complete rotation of shaft 9 (i. e., until pin 15 again engages pin 14).

It will be understood from the above description that I have provided a simple yet rugged two speed drive mechanism which is economical to manufacture and reliable in operation. When the drive mechanism is used in conjunction with variable tuning elements of high frequency apparatus the operator may, each time a new frequency setting is desired, rotate the driven member upon which the tuning element or elements is mounted at the "higher" drive speed (i. e., through the low reduction coupling arrangement) until an approximate frequency setting is made. Then, by simply rotating the control knob in the opposite direction, the vernier action of the drive mechanism is automatically brought into operation.

While I have shown a particular embodiment of my invention, it will of course be understood that I do not wish to be limited thereto since many modifications may be made, and I therefore contemplate by the appended claims to cover all such modifications as fall within the true spirit and scope of my invention.

What I claim as new and desire to secure by Letters Patent of the United States is:

1. In combination, a drive shaft, a driven shaft, said shafts having different axes, an arm connected to the driven shaft and extending therefrom toward said drive shaft, means to oscillate the end of said arm nearest the drive shaft about the axis of the driven shaft in response to rotation of the drive shaft through a predetermined range thereby to rotate said driven shaft, and additional means to drive the driven shaft independently of said arm in response to rotation of the drive shaft after said predetermined range is exceeded.

2. In combination, a drive shaft, a driven shaft, an arm connected to the driven shaft, means to oscillate said arm about the axis of the driven shaft in response to rotation of the drive shaft through a predetermined range, means frictionally engaging said arm and said driven shaft to drive said driven shaft in response to movement of said arm, and additional means to drive the driven shaft independently of said arm in response to rotation of the drive shaft after said predetermined range is exceeded.

3. In combination, a rotatable driving member, a driven member, means for transmitting rotational motion of said driving member to said driven member, said means being inoperative during a predetermined range of movement of said driving member, a drive arm mounted on said driven member and having a free end extending in proximity to said driving member, means to prevent relative movement of said arm and said driven member during said predetermined range of movement of said driving member and to restrain said arm during further movement of the driving member when the driven member is rotated by said first means, and means operably connecting the free end of said arm with said driving member for causing angular movement of said arm in response to rotational movement of said driving member over said predetermined range.

4. In combination, a rotatable driving member, a driven member, means for transmitting rotational motion of said driving member to said driven member, said means being inoperative during a predetermined range of movement of said driving member, a drive arm mounted on said driven member and having a forked-end extending in spaced relation about said driving member, means to prevent relative movement of said arm and said driven member during said predetermined range of movement of said driving member, a flexible cable extending across the forked portion of said arm and wrapped at least once about said driving member, and means for restraining the range of movement of said arm, said cable being adapted to slip on said driving member when said arm is in a restrained position.

5. In combination, a rotatable driving member, a driven member, a pulley secured to said driven member, a second pulley rotatably mounted on said driving member, a flexible drive cable extending about said pulleys, a pin secured to said second pulley and extending axially thereof, a second pin secured to said driving member in proximity to said first pin and extending radially from said driving member, a drive arm mounted on said driven member having a forked end extending in spaced relation about said driving member, means to prevent relative movement of said arm and said driven member when said second pin is disengaged from said first pin, a flexible cable extending across the forked portion of said arm and wrapped at least once about said driving member, and means for restraining the range of movement of said arm, said second cable being adapted to slip on said driving member when said arm is in a restrained position.

6. In combination, a pair of non-coaxial shafts, dual means to drive one of said shafts from the other, said means comprising an arm connected with the shaft to be driven and extending therefrom, means responsive to rotation of the other of said shafts to move said arm thereby to rotate the shaft to be driven, and additional means to rotate the shaft to be driven in response to movement of said other shaft while restraining said arm against movement relative to the driven shaft.

7. In combination, a pair of non-coaxial shafts, dual means to drive one of said shafts from the other, said means comprising an arm frictionally engaging the shaft to be driven and extending laterally therefrom, means responsive to rotation of the other of said shafts to move said arm thereby to rotate the shaft to be driven, and additional means to rotate the shaft to be driven in response to movement of said other shaft while restraining said arm against movement relative to the driven shaft.

8. In combination, a pair of non-coaxial shafts, an arm connected to one shaft and extending laterally therefrom, means responsive to movement of the other shaft to move said arm about said one shaft as an axis thereby to drive said one shaft at reduced speed, a second reduction drive connection between said shafts, and means to render said second reduction drive connection ineffective during movement of the first shaft through a predetermined range and effective after said movement exceeds said range.

9. In combination, a pair of non-coaxial shafts, an arm connected to one shaft and having projections straddling the axis of the other shaft, means responsive to rotation of the other shaft to move said projections relative to said other shaft thereby to drive said one shaft, a pinion loosely mounted on said other shaft, means responsive to movement of said other shaft in excess of a predetermined range to drive said pinion and means utilizing said pinion to drive said one shaft.

10. In combination, a pair of non-coaxial shafts, an arm connected to one shaft and having projections straddling the axis of the other shaft, means responsive to rotation of the other shaft to move said projections relative to said other shaft thereby to drive said one shaft, a pinion loosely mounted on said other shaft, a pin projecting from said other shaft, said pinion having a pin projecting into the path of said first pin, thereby to cause rotation of said pinion when predetermined movement of said other shaft is exceeded, and means to utilize said pinion to drive said one shaft.

11. In combination, a pair of non-coaxial shafts, an arm connected to one shaft and extending laterally therefrom, means responsive to rotation of the other shaft to move said arm about the axis of said one shaft thereby to drive said one shaft at reduced speed, a pinion loosely mounted on said other shaft, means responsive to movement of said other shaft in excess of a predetermined range to drive said pinion, and means utilizing said pinion to drive said one shaft.

DONALD R. DE TAR.